(12) United States Patent
Pentek et al.

(10) Patent No.: US 8,568,601 B2
(45) Date of Patent: Oct. 29, 2013

(54) FENCELESS MAIN POLE DEFINITION FOR ADVANCED PERPENDICULAR MAGNETIC WRITE HEAD

(75) Inventors: Aron Pentek, San Jose, CA (US); Sue Siyang Zhang, Saratoga, CA (US); Yi Zheng, San Ramon, CA (US)

(73) Assignee: HGST Netherlands B.V., Amsterdam (NL)

( * ) Notice: Subject to any disclaimer, the term of this patent is extended or adjusted under 35 U.S.C. 154(b) by 935 days.

(21) Appl. No.: 11/947,616

(22) Filed: Nov. 29, 2007

(65) Prior Publication Data
US 2009/0139958 A1    Jun. 4, 2009

(51) Int. Cl.
*B44C 1/22* (2006.01)
*H01L 21/00* (2006.01)

(52) U.S. Cl.
USPC .................................. 216/22; 438/3

(58) Field of Classification Search
USPC .............. 216/22; 438/3; 29/603.12, 603.13; 336/323
See application file for complete search history.

(56) References Cited

U.S. PATENT DOCUMENTS

| 6,118,623 | A | 9/2000 | Fatula, Jr. et al. .......... 360/113 |
| 6,477,019 | B2 | 11/2002 | Matono et al. |
| 7,429,493 | B2 * | 9/2008 | Jiang et al. .......... 438/3 |
| 7,649,712 | B2 | 1/2010 | Le et al. |
| 2004/0066576 | A1 * | 4/2004 | Lee et al. .......... 360/126 |
| 2005/0066517 | A1 | 3/2005 | Bedell et al. .......... 29/603.13 |
| 2005/0068672 | A1 | 3/2005 | Lee et al. .......... 360/216 |
| 2005/0172479 | A1 * | 8/2005 | Sasaki .......... 29/603.16 |
| 2006/0028762 | A1 * | 2/2006 | Gao et al. .......... 360/125 |
| 2006/0044682 | A1 * | 3/2006 | Le et al. .......... 360/126 |
| 2006/0231523 | A1 | 10/2006 | Baer et al. .......... 216/22 |
| 2006/0288565 | A1 | 12/2006 | Le et al. .......... 29/603.12 |
| 2007/0026537 | A1 | 2/2007 | Jiang et al. .......... 438/3 |
| 2007/0081278 | A1 | 4/2007 | Feldbaum et al. .......... 360/323 |
| 2007/0148953 | A1 * | 6/2007 | Itani et al. .......... 438/618 |
| 2008/0271308 | A1 * | 11/2008 | Hsiao et al. .......... 29/603.16 |

OTHER PUBLICATIONS

Restriction Requirement from U.S. Appl. No. 12/343,713 dated Feb. 16, 2011.
Non-Final Office Action Summary from U.S. Appl. No. 12/343,713 dated Mar. 24, 2011.
Final Office Action Summary from U.S. Appl. No. 12/343,713 dated Aug. 30, 2011.
Notice of Allowance and Fee(s) Due from U.S. Appl. No. 12/343,713 dated Nov. 21, 2011.

* cited by examiner

*Primary Examiner* — Duy Deo
*Assistant Examiner* — Mahmoud Dahimene
(74) *Attorney, Agent, or Firm* — Zilka-Kotab, PC

(57) ABSTRACT

A method for manufacturing a magnetic write head for perpendicular magnetic recording. The method includes forming a write pole using a mask that includes a hard mask layer deposited over the write pole laminate material, and a thick, physically robust image transfer layer. The image transfer layer can be a material such as AlTiO that can be patterned by a reactive ion etching process, but which also resists deformation during processing. This process allows a write pole and wrap-around trailing shield to be constructed at very narrow track widths without the mask deformation and fencing problems experienced by prior art methods.

19 Claims, 13 Drawing Sheets

FENCELESS MAIN POLE DEFINITION FOR ADVANCED PERPENDICULAR MAGNETIC WRITE HEAD

FIELD OF THE INVENTION

The present invention relates to perpendicular magnetic recording and more particularly to a method for manufacturing a write pole of perpendicular magnetic write head.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, referred to as a spacer layer, sandwiched between first and second ferromagnetic layers, referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

As write head become smaller in order to meet data density requirements, the manufacture of write heads having ever decreasing track widths becomes ever more difficult. Manufacturing issues, mask deformation and fence formation due to re-deposition present greater challenges. Therefore, there is a need for a method for manufacturing a perpendicular magnetic write head, that can allow a write head to be accurately and reliably constructed at very small write head sizes, and that can overcome currently existing manufacturing challenges that have limited such write head size reductions.

SUMMARY OF THE INVENTION

The present invention provides a method for manufacturing a magnetic write head for perpendicular magnetic recording. The method includes depositing a magnetic write pole on a substrate, and then forming a series of mask layers over the substrate. The mask layers include a hard mask formed over the magnetic write pole material and a physically robust, RIEable image transfer layer deposited above the hard mask. A photoresist layer is deposited above the image transfer layer and is photolithographically patterned to define a write pole shape. Then, a reactive ion etching is performed to transfer the image of the photoresist mask onto the underlying image transfer layer. An ion milling can be performed to remove portions of the magnetic write pole material that are not protected by the image transfer layer.

Because the image transfer layer is physically robust, it can withstand the ion milling without bending or otherwise deforming, even at very narrow track widths. Also, the above described process advantageously avoids re-deposition fencing issues.

The series of mask layers can also include a first RIEable hard mask layer disposed between the hard mask layer and the image transfer layer, and can include a second RIEable hard mask layer between the image transfer layer and the photoresist mask layer.

After the write pole has been formed, a layer of conformally deposited, non-magnetic side gap material such as alumina can be deposited, followed by an ion milling (which can be performed in an Ar chemistry) to open up the non-magnetic side gap layer, exposing the first RIEable hard mask layer. A reactive ion etching can then be performed to remove the first RIEable hard mask, after which a wrap around trailing shield can be formed, with the remaining hard mask defining a trailing gap and the remaining non-magnetic side gap material defining a side gap.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
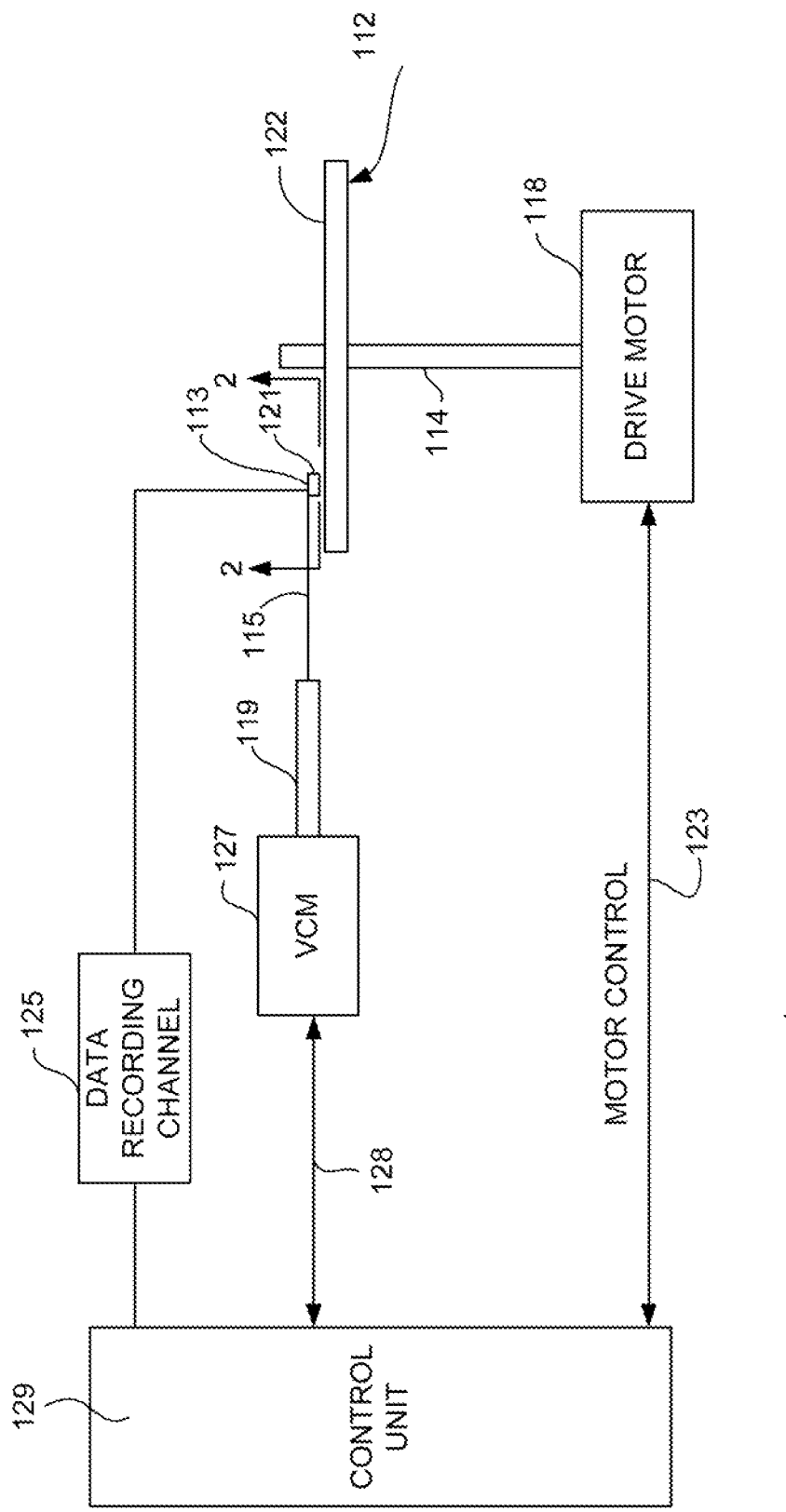
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances die slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
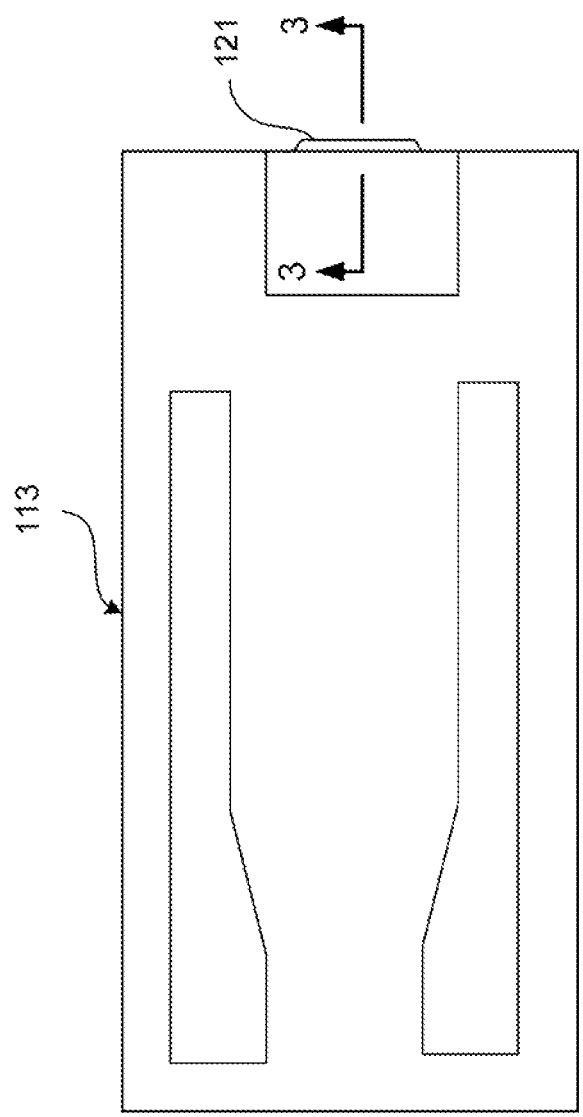
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
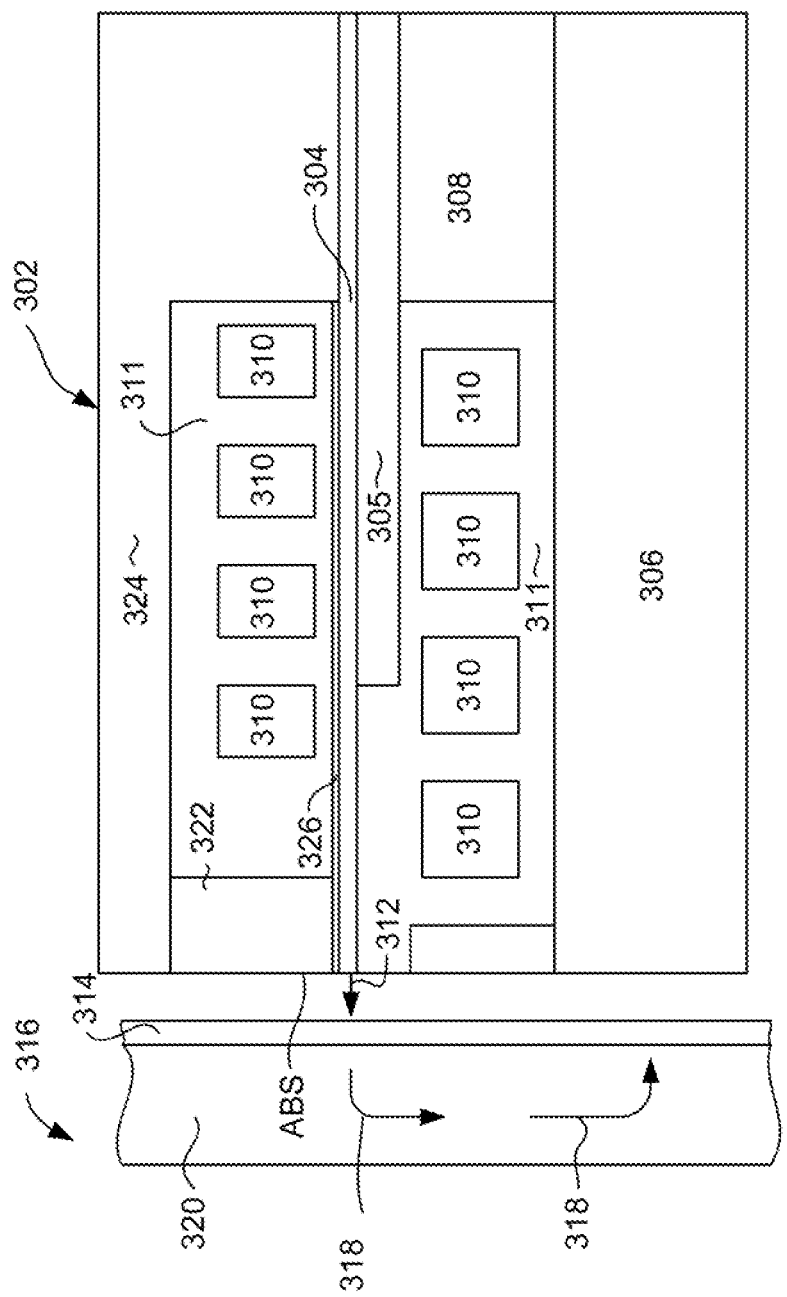
FIG. 3 is a cross sectional view of a magnetic head, taken from line 3-3 of FIG. 2 and rotated 90 degrees counterclockwise, of a magnetic write head according to an embodiment of the present invention.

With reference now to FIG. 3, the invention can be embodied in a magnetic write head 302. The write head includes a write pole 304 and a first, or leading, return pole 306. The return pole has a cross section at the air bearing surface (ABS) that is much larger than that of the write pole. The write pole 304 can be formed upon a magnetic shaping layer 305. The return pole 306 can be magnetically connected with the write pole 304 and shaping layer 305 by a magnetic back gap 308 located away from the ABS. An electrically conductive, non-magnetic write coil 310, shown in cross section in FIG. 3 passes through the write head 302, and can be embedded in a non-magnetic, electrically insulating coil insulation layer 311. When current flows through the write coil 310, a magnetic field is produced, which induces a magnetic flux through the write pole 304. This magnetic flux causes a highly concentrated write field 312 to be emitted from the write pole 312, which locally magnetizes a magnetically hard top layer 314 of a magnetic medium 316. A resulting magnetic flux 318 flows through a magnetically softer under-layer of the magnetic medium 316 to return to the return pole 306 where it is sufficiently spread out thin it does not magnetize the top layer 314.

A magnetic trailing shield 322 can be provided at the ABS and is separated from the trailing edge of the write pole 304 by a non-magnetic trailing gap layer 324. The trailing shield 322 can be magnetically connected with the back gap layer 308 by a second, or trailing, magnetic pole 323.

An upper, or trailing return pole 324 is stitched to the trailing shield 322 and magnetically connects the trailing shield 322 with the write pole 304 and back gap 308.

The presence of the trailing magnetic shield 322 adjacent to the trailing edge of the write pole 304 increases write speed by increasing the field gradient of the write field 312. The smaller the gap between the trailing shield 322 and the write pole 304 the more the field gradient will be increased. However, if the trailing shield is too close to the write pole 304, the strength of the write field will suffer, because too much flux will be leaked from the write pole 304 to the trailing shield 322. The non-magnetic spacer 326 ensures that the trailing shield 322 will be not be too close to the write pole 304 in regions removed from the ABS, thereby maximizing the field gradient increase provided by the trailing shield 322, while minimizing the loss of flux to the trailing shield 322.

Figure 4:
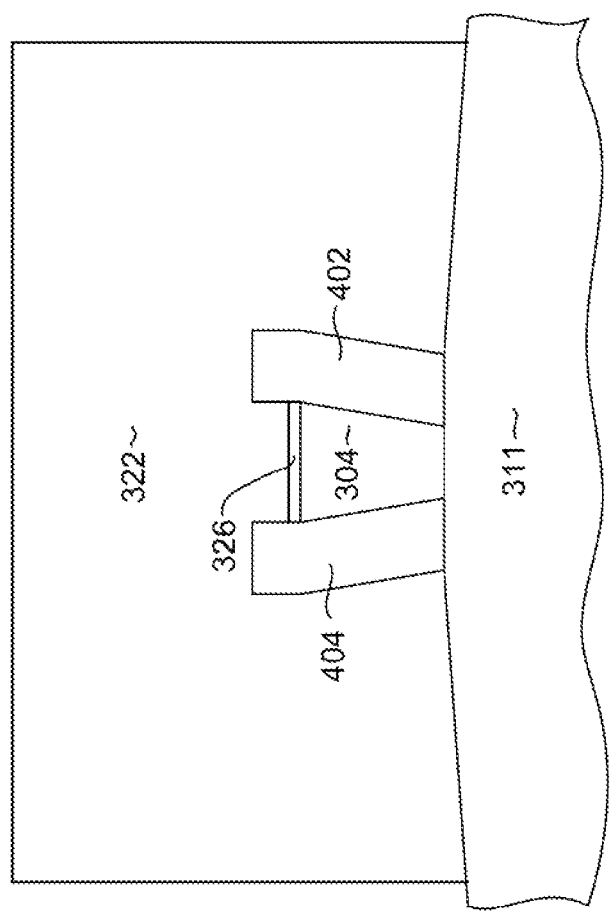
FIG. 4 is an air bearing surface view of a portion of the write head shown of FIG. 3.
Figure 5:
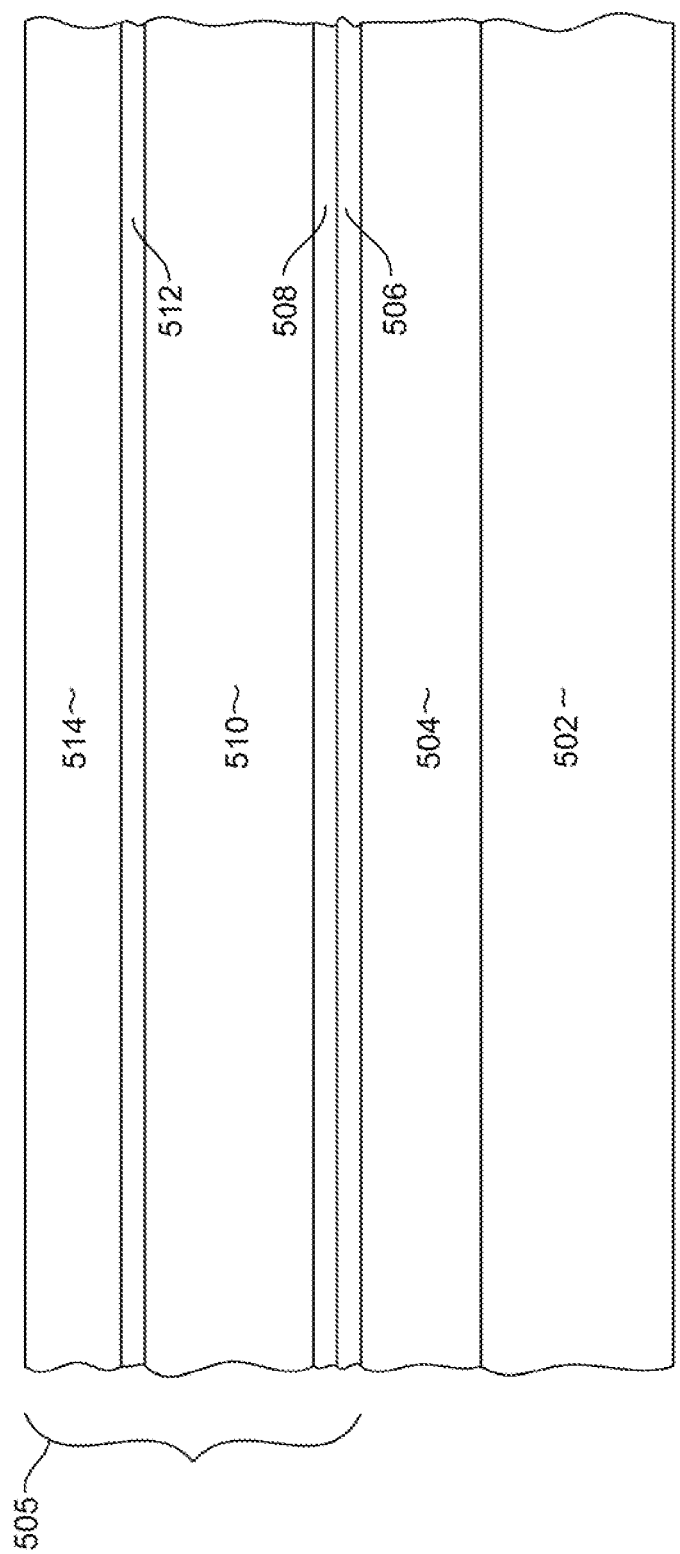
FIGS. 5-13 are illustrations of a write head in various intermediate stages of manufacture illustrating a method of manufacturing a magnetic write head according to an alternate embodiment of the invention.

With reference now to FIG. 4, a view of the write pole 304 can be seen as viewed from the air bearing surface (ABS). As can be seen, the write pole 304 has a trapezoidal shape with tapered sides. The magnetic shield 322 wraps around the write pole 304 and is separated from the sides of the write pole by non-magnetic side gap layers 402, 404.

With reference now to FIGS. 5-13, a method will be described for manufacturing a write pole 304 and wrap-around trailing shield 322 such as is shown in FIGS. 3 and 4. With particular reference to FIG. 4, a substrate 502 is provided. The substrate 502 can include the insulation layer 311 and a portion of the shaping layer 305 described above with reference to FIG. 3. A magnetic write pole material 504 is deposited on top of the substrate. The magnetic write pole material 504 can be a lamination of magnetic layers (such as CoFe) separated by thin non-magnetic layers. A series of mask layers 505 are deposited over the write pole material 504. The series of mask layers 505 can include a thin alumina hard mask layer 506 formed directly over the write pole material 504, which can have a thickness of about 10-30 nm. A thin first RIEable hard mask layer 408 is formed over the alumina hard mask. The first RIEable hard mask can be constructed of a material that can be removed by reactive ion etching (RIE) such as SiO$_2$, and can have a thickness of 20-40 nm or about 30 nm. The mask structure also includes a thick, physically robust, RIEable image transfer layer 510. This layer 510 is preferably constructed of AlTiO or Al$_2$O$_3$ and preferably has a thickness of 100 to 700 nm or about 600 nm. The term "physically robust" is used herein to describe a material that is resistant to deformation during subsequent processing steps, such as reactive ion etching and/or ion milling, as compared with previously used materials such as DURAMIDE®, which tend to bend and otherwise deform when used to define very narrow track width write heads. The term "RIEable" is used herein to define a material that can be removed by reactive ion etching (RIE), especially by a reactive ion etching that is performed in a chemistry that is specifically chosen to selectively remove the RIEable material.

Another thin, RIEable hard mask layer 512 can be provided over the image transfer layer 510. The second RIEable hard mask layer 512 can be constructed of a material such as Co, Cr, etc. Finally a layer of photoresist 514 is deposited at the top of the series of mask layers 505. The photoresist layer 514 is preferably a short wavelength photoresist, such as a photoresist that can be patterned by a 193 nm photolithography. This allows the photoresist to be developed very accurately for accurate definition of a write pole structure as will described below. The presently described method allows the use of such a short wavelength photolithography.

Figure 6:
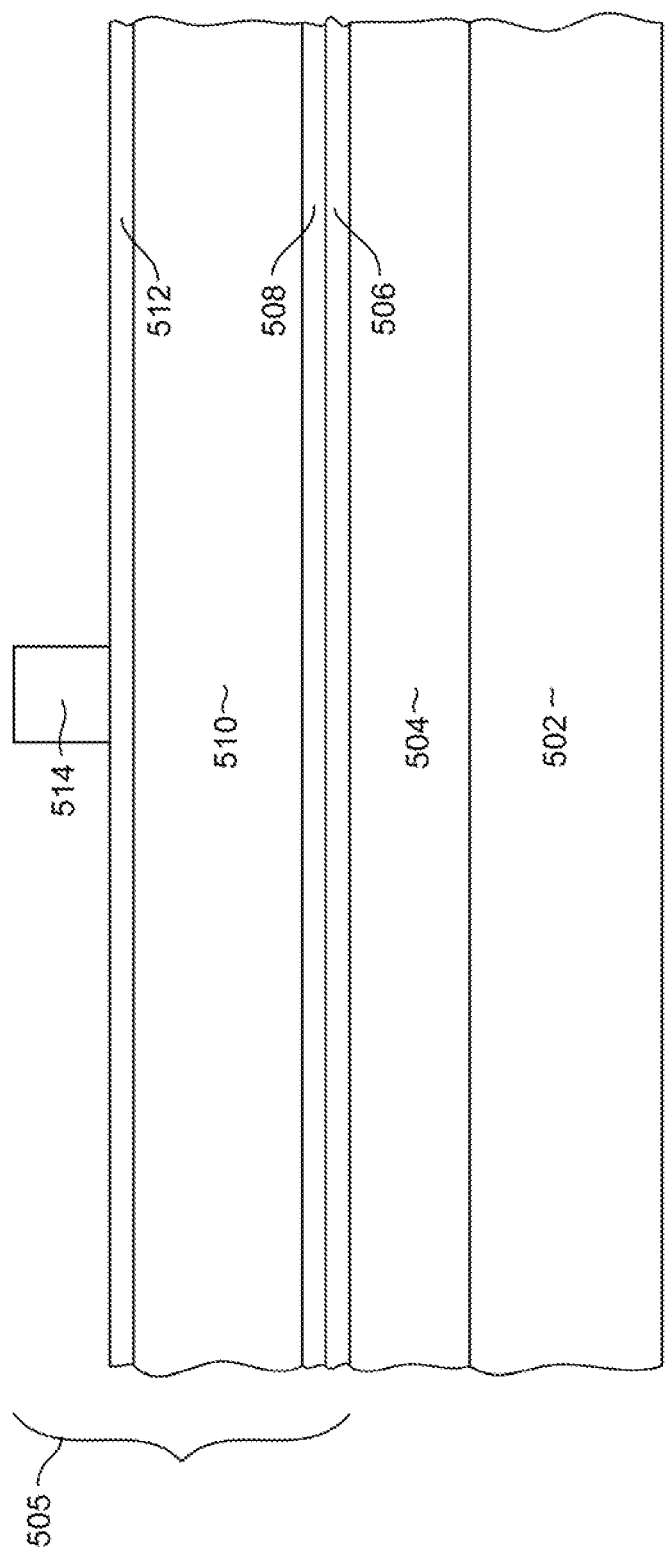
Figure 7:
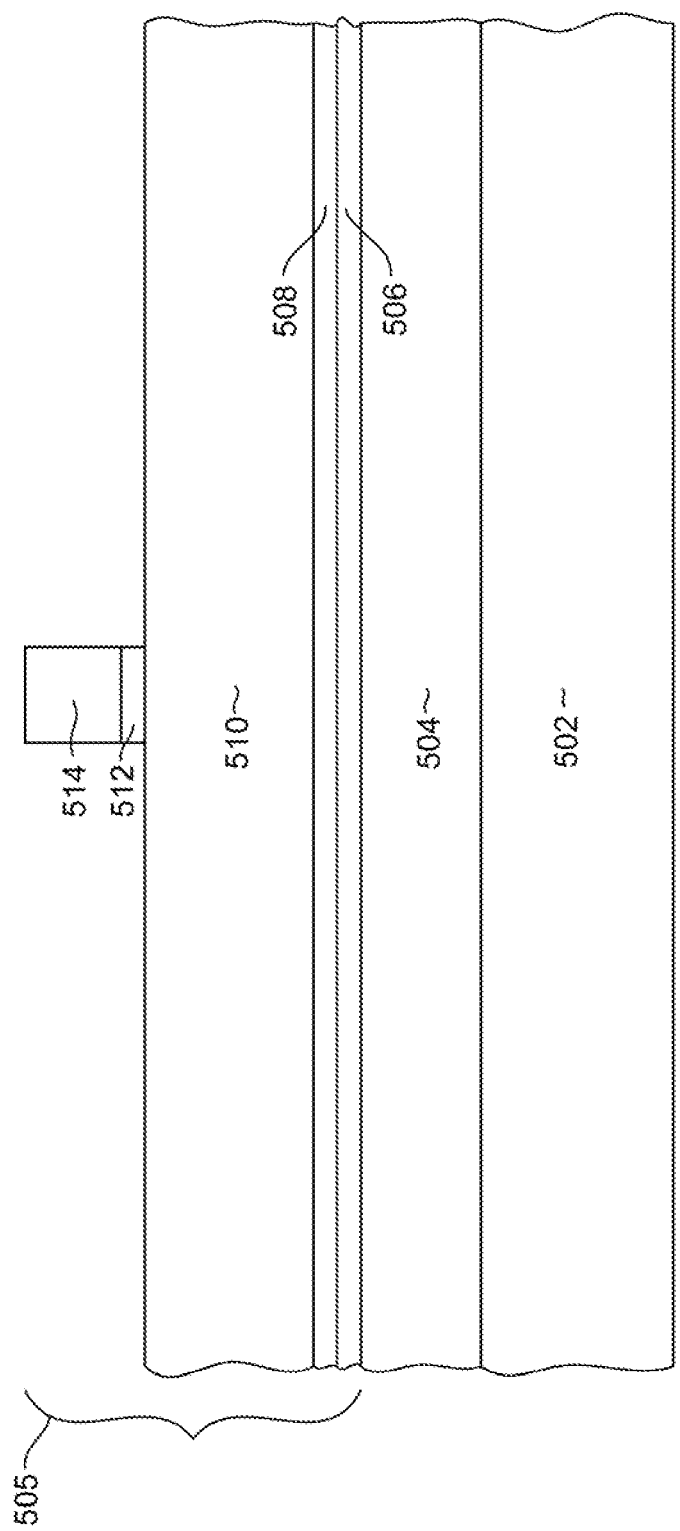

With reference now to FIG. 6, the photoresist layer 514 is photolithographically patterned and developed to define a desired write pole shape. Then, a first reactive ion etching (RIE) is performed to remove portions of the hard mask layer 512 that are not protected by the photoresist 514 resulting in a structure as shown in FIG. 7. This first RIE is performed in a chemistry such as a chlorine containing chemistry that is designed to selectively remove the material making up the top RIEable hard mask layer 512. An alternative is to use ion milling to transfer photoresist pattern 514 into layer 512 as in FIG. 7 instead of using reactive ion etching.

Figure 8:
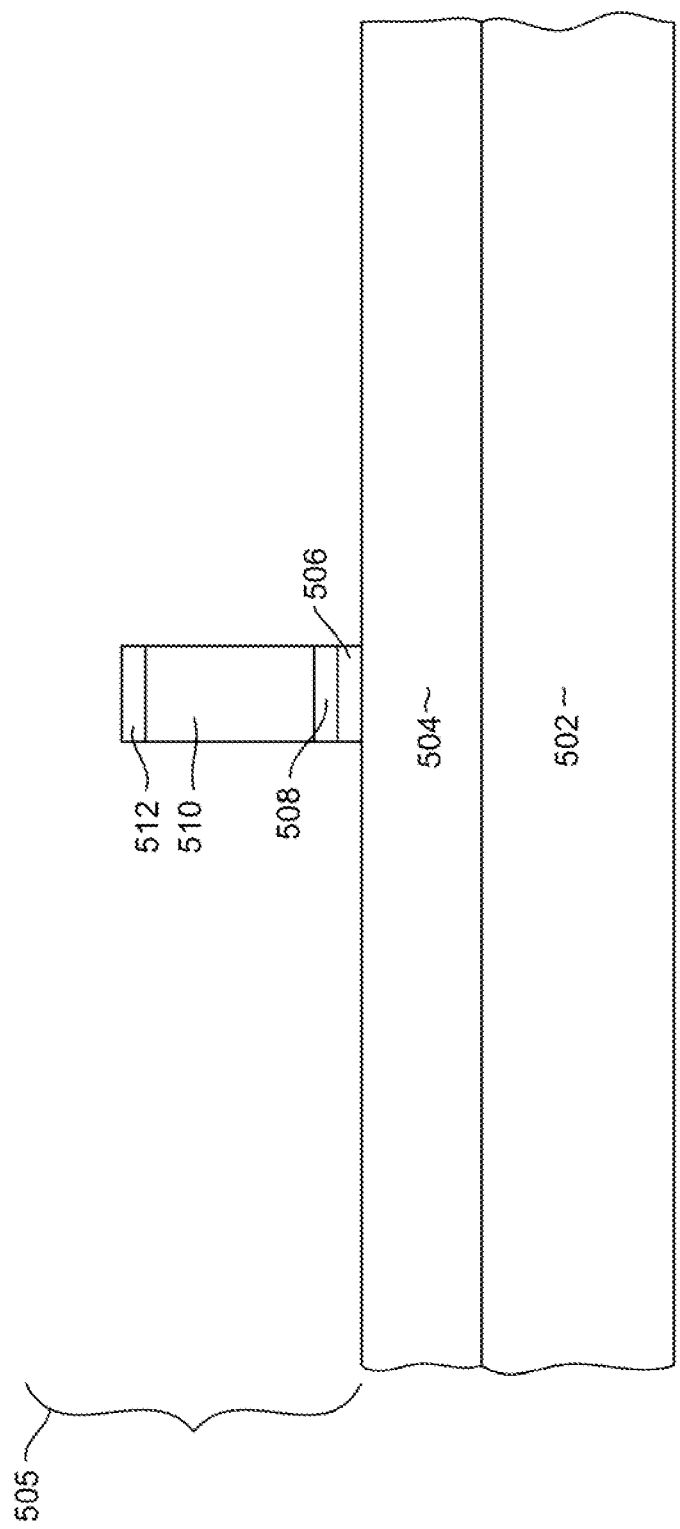

Then, a second RIE is performed to remove portions of the 510 and 508 and 506 that are not protected by the mask layers 514 and 512, resulting in a structure as shown in FIG. 8. This second RIE can also be performed using a chlorine based chemistry, but is performed in a chemistry that is adjusted to selectively remove the AlTiO image transfer layer 510 and SiN hard mask layer 508.

Figure 9:
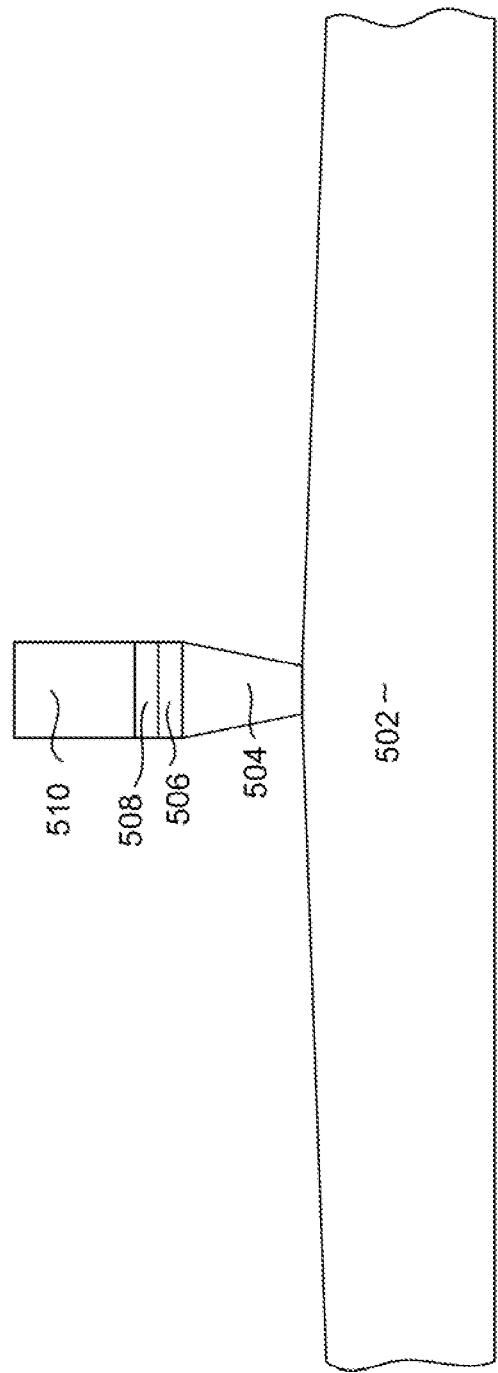

Then, an ion milling is performed, to remove portions of the write pole material 504 that are not protected by the overlying mask layers 508, 510. The ion milling is preferably performed at one or more angles relative to normal to form a write pole 504 having a desired trapezoidal shape, as shown in FIG. 9.

Figure 10:
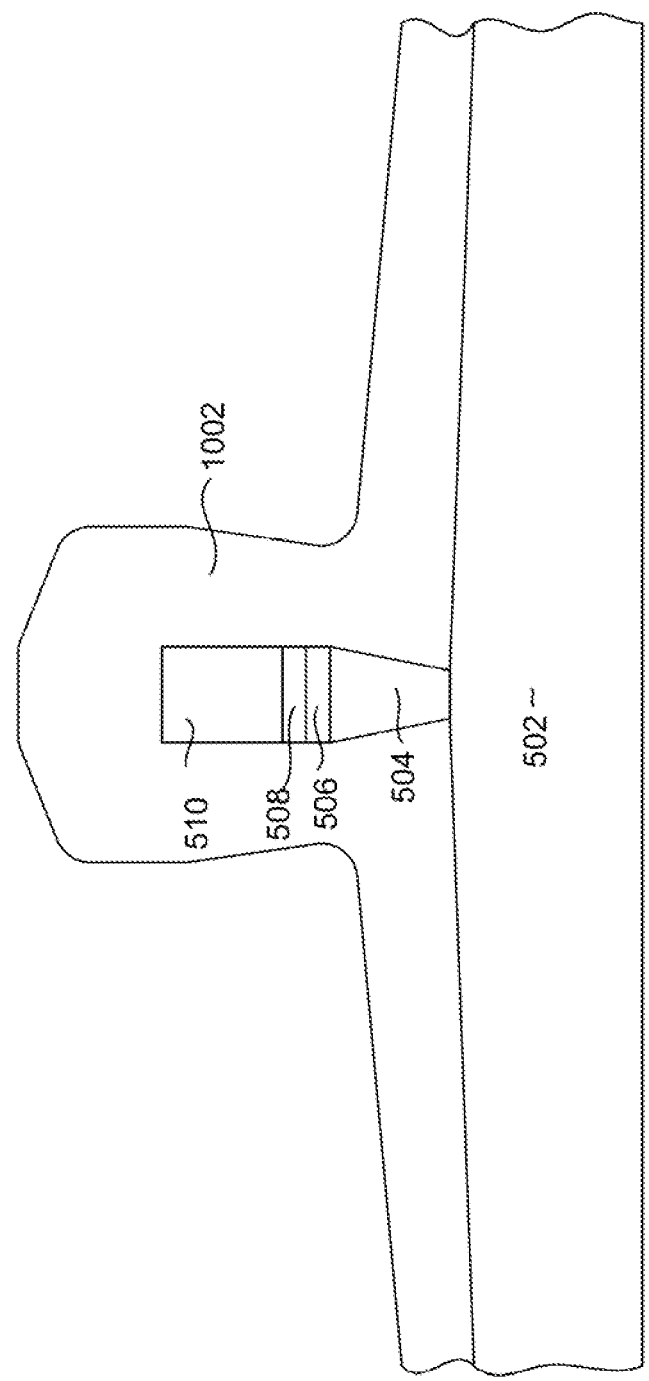
Figure 11:
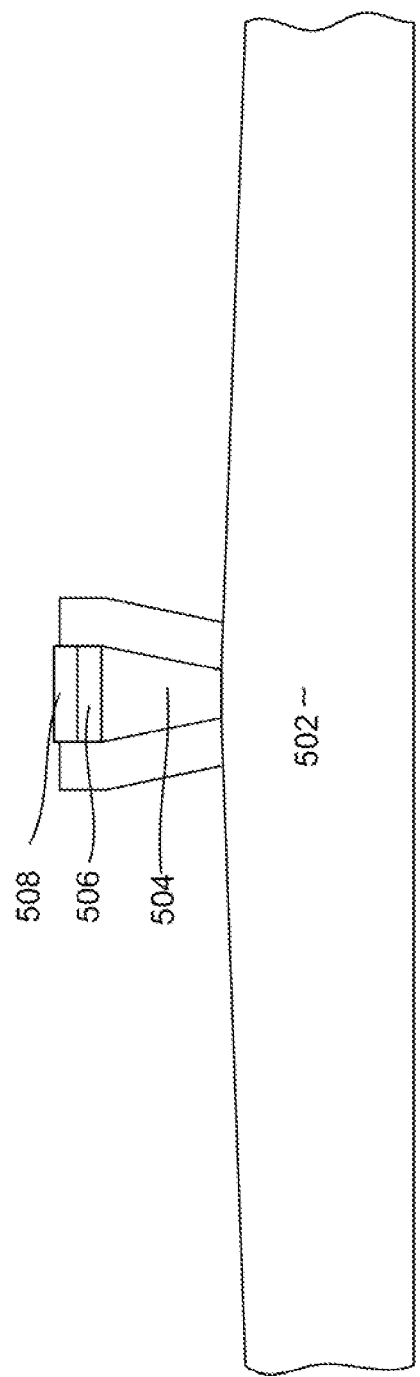

With reference now to FIG. 10, a layer of non-magnetic side gap material 1002 is deposited. The non-magnetic side gap material 1002 is preferably alumina, deposited by a conformal deposition process such as atomic layer deposition (ALD) or chemical vapor deposition (CVD). Then, a material removal process is performed to preferentially remove horizontally disposed portions of the alumina layer 1002 and also to remove the remaining portions of the image transfer layer 510, resulting in a structure as shown in FIG. 11. The material removal process is preferably an ion milling performed in an Ar containing chemistry. An end point detection method such as Secondary Ion Mass Spectroscopy (SIMS) is used to detect the presence of Ti in the mask layer 510 to determine when ion milling should be terminated.

Figure 12:
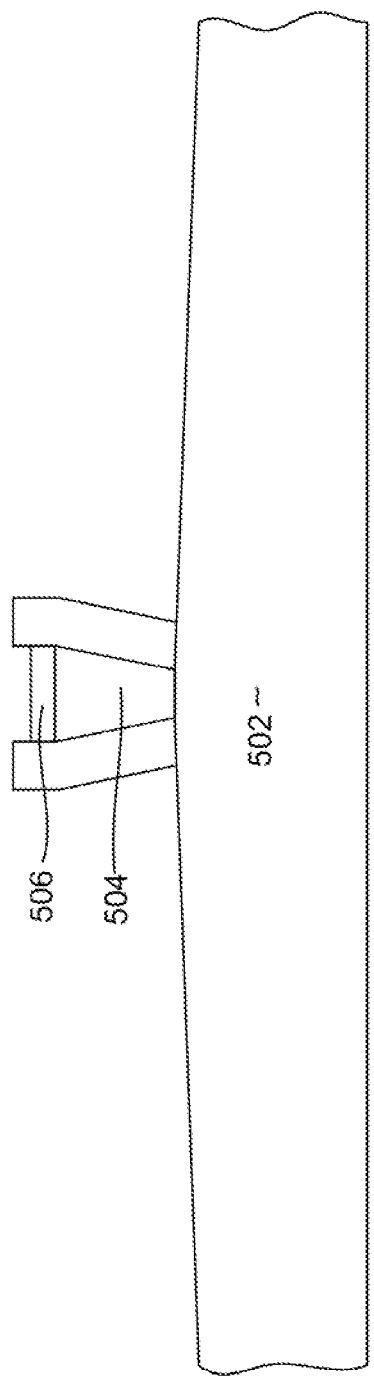

Another Reactive Ion Etching (RIE) is then performed to remove the remaining REIable hard mask layer 508, leaving the underlying alumina hard mask 506, resulting in a structure as shown in FIG. 12. The thickness of the remaining thin alumina mask layer 506 defines part of a trailing shield gap, and the thickness of the alumina side wails 1002 defines part of the shield side gap thickness.

Figure 13:
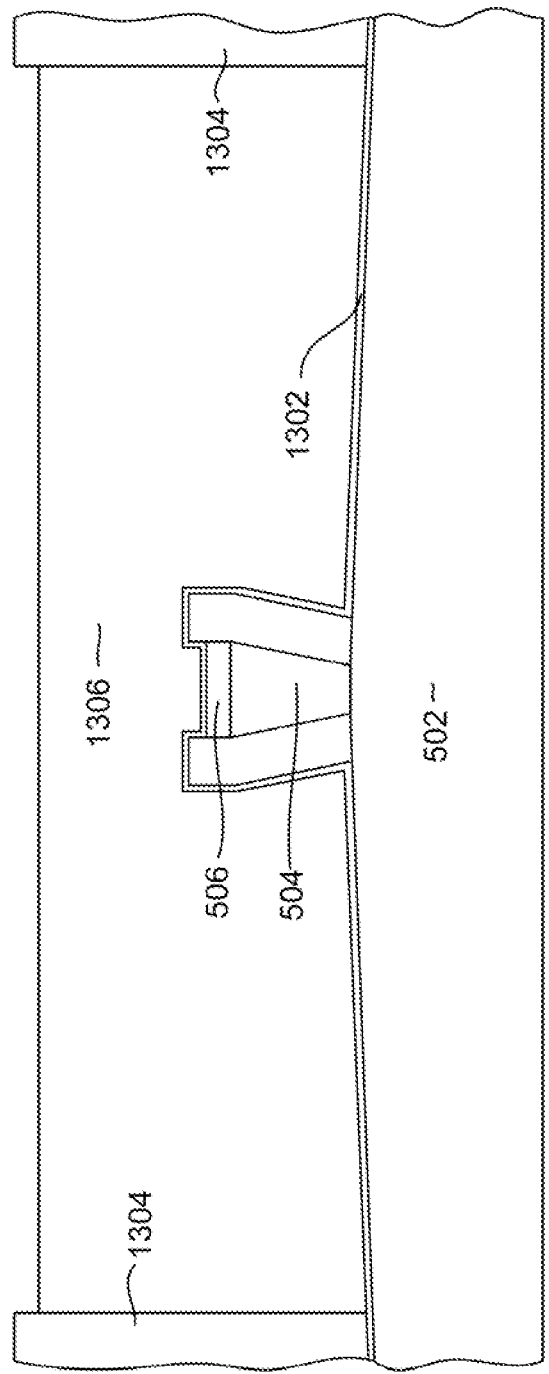

With reference now to FIG. 13, a non-magnetic electrically conductive seed layer 1302 such as Ir, Ru or Rh, is deposited, and a photoresist electroplating frame 1304 is constructed, having an opening configured to define a trailing, wrap-around magnetic shield. A magnetic material 1306 can then be electroplated into the opening in the electroplating frame mask 1304 to form a trailing, wrap-around magnetic shield. The electroplating frame mask 1304 can then be wet stripped.

The above described process provides a method for manufacturing a write pole and trailing wrap around shield that can be used to form very narrow write poles (ie. narrow track widths). Previous processes have suffered from mask structures having insufficient physical robustness to be used at very narrow track widths. At very narrow track widths these previously used mask structures tend to bend and fail. The above described method, using a hard RIEable image transfer layer 510 can be used at very narrow track widths, because the image transfer layer is physically very tough and resistant to bending, while also being readily removed by reactive ion etching as desired. Mask deformation is also prevented by the use of reactive ion etching to pattern the image transfer layer 510, rather than a more aggressive ion milling.

Prior art processes have also suffered from the formation of fence structure as a result of re-deposited material forming on the sides of the mask structures. Such fence formation problems have resulted in a need to perform high angled ion milling operations or other aggressive processes to remove such these fences, and such processes have lead to damage to the write pole or other write head structures. The process described above avoids such fencing issues, eliminating the need for such harsh, aggressive fence removal steps.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head for use in a perpendicular magnetic recording system, the method comprising:
    providing a substrate;
    depositing a magnetic write pole material over the substrate;
    depositing a hard mask layer over the magnetic write pole material;
    depositing a physically robust image transfer layer comprising AlTiO over the hard mask layer;
    forming a photoresist mask over the physically robust image transfer layer;
    performing a reactive ion etching (RIE) to transfer the image of the photoresist mask onto the physically robust image transfer layer and the hard mask layer; and
    performing an ion milling to remove portions of the magnetic write pole material layer that are not protected by the image transfer layer and hard mask layer.

2. A method for manufacturing a magnetic write head for use in a perpendicular magnetic recording system, the method comprising:
    providing a substrate;
    depositing a magnetic write pole material over the substrate;
    depositing a hard mask layer over the magnetic write pole material;
    depositing a physically robust image transfer layer comprising AlTiO over the hard mask layer;
    forming a photoresist mask over the physically robust image transfer layer;
    performing a reactive ion etching (RIE) to transfer the image of the photoresist mask onto the physically robust image transfer layer and the hard mask layer; and
    performing an ion milling to remove portions of the magnetic write pole material layer that are not protected by the image transfer layer and hard mask layer wherein the physically robust image transfer layer has a thickness of 100 to 700 nm.

3. A method for manufacturing a magnetic write head for use in a perpendicular magnetic recording system, the method comprising:
    providing a substrate;
    depositing a magnetic write pole material over the substrate;
    depositing a hard mask layer over the magnetic write pole material;
    depositing a physically robust image transfer layer constructed of a material that can be removed by reactive ion etching over the hard mask layer;
    forming a photoresist mask over the physically robust image transfer layer;
    performing a reactive ion etching (RIE) to transfer the image of the photoresist mask onto the physically robust image transfer layer and the hard mask layer; and
    performing an ion milling to remove portions of the magnetic write pole material layer that are not protected by the image transfer layer and hard mask layer wherein the physically robust image transfer layer comprises AlTiO having a thickness of 100-700 nm.

4. A method for manufacturing a magnetic write head for use in a perpendicular magnetic recording system, the method comprising:
    providing a substrate;
    depositing a magnetic write pole material over the substrate;
    depositing a hard mask layer over the magnetic write pole material;
    depositing a physically robust image transfer layer comprising AlTiO over the hard mask layer;
    forming a photoresist mask over the physically robust image transfer layer;
    performing a reactive ion etching (RIE) to transfer the image of the photoresist mask onto the physically robust image transfer layer and the hard mask layer; and
    performing an ion milling to remove portions of the magnetic write pole material layer that are not protected by the image transfer layer and hard mask layer wherein the hard mask layer comprises alumina.

5. A method for manufacturing a magnetic write head for use in a perpendicular magnetic recording system, the method comprising:
    providing a substrate;
    depositing a magnetic write pole material over the substrate;
    depositing a hard mask layer over the magnetic write pole material;
    depositing a physically robust image transfer layer comprising AlTiO over the hard mask layer;
    forming a photoresist mask over the physically robust image transfer layer;
    performing a reactive ion etching (RIE) to transfer the image of the photoresist mask onto the physically robust image transfer layer and the hard mask layer; and
    performing an ion milling to remove portions of the magnetic write pole material layer that are not protected by the image transfer layer and hard mask layer wherein the hard mask layer is a bi-layer structure comprising a first layer comprising alumina and a second layer comprising a material that can be removed by reactive ion etching, the second layer being located between the first layer and the physically robust image transfer layer.

6. A method for manufacturing a magnetic write head for use in a perpendicular magnetic recording system, the method comprising:
    providing a substrate;
    depositing a magnetic write pole material over the substrate;
    depositing first hard mask layer over the magnetic write pole material;
    depositing a physically robust image transfer layer comprising AlTiO over the hard mask layer;
    forming a photoresist mask over the physically robust image transfer layer;
    performing a reactive ion etching (RIE) to transfer the image of the photoresist mask onto the physically robust image transfer layer and the hard mask layer; and
    performing an ion milling to remove portions of the magnetic write pole material layer that are not protected by the image transfer layer and hard mask layer; and further comprising depositing a second hard mask layer, constructed of a material that can be removed by reactive ion etching, between the physically robust image transfer layer and the photoresist layer.

7. A method as in claim 5 wherein the first hard mask layer comprises SiN or $SiO_2$.

8. A method as in claim 6 wherein the second hard mask layer comprises Co or Cr.

9. A method for manufacturing a magnetic write head for use in a perpendicular magnetic recording system, the method comprising:
providing a substrate;
depositing a magnetic write pole material over the substrate;
depositing a hard mask layer over the magnetic write pole material;
depositing a physically robust image transfer layer comprising AlTiO over the hard mask layer;
forming a photoresist mask over the physically robust image transfer layer;
performing a reactive ion etching (RIE) to transfer the image of the photoresist mask onto the physically robust image transfer layer and the hard mask layer; and
performing an ion milling to remove portions of the magnetic write pole material layer that are not protected by the image transfer layer and hard mask layer;
wherein the hard mask layer is an alumina hard mask layer, and wherein the method further comprises depositing a first hard mask layer between the alumina hard mask layer and the physically robust image transfer layer and depositing a second hard mask layer between the physically robust, image transfer layer and the photoresist layer.

10. A method as in claim 9 wherein the first hard mask layer comprises SiN.

11. A method as in claim 9 wherein the second hard mask layer comprises Cr or Co.

12. A method as in claim 9 wherein the first hard mask layer comprises SiN and the second hard mask layer comprises Co or Cr.

13. A method for manufacturing a magnetic write head for use in a perpendicular magnetic recording system, the method comprising:
providing a substrate;
depositing a magnetic write pole material over the substrate;
depositing a first hard mask layer over the magnetic write pole material;
depositing a second hard mask layer, constructed of a material that can be removed by reactive ion etching, over the first hard mask layer;
depositing a physically robust image transfer layer, comprising AlTiO, over the second hard mask layer;
forming a photoresist mask over the physically robust image transfer layer;
performing a first reactive ion etching (RIE) to transfer the image of the photoresist mask onto the physically robust image transfer layer;
performing a first ion milling to remove portions of the hard mask layer and magnetic write pole material layer that are not protected by the image transfer layer
conformally depositing a non-magnetic side gap material;
performing a second ion milling to remove portions of the non-magnetic side gap material, the ion milling being performed sufficiently to expose the second hard mask layer;
performing a second reactive ion etching to remove the second hard mask layer; and
depositing a magnetic material to form a magnetic shield.

14. A method as in claim 13 wherein the physically robust, image transfer layer has a thickness of 100 to 700 nm.

15. A method as in claim 13 wherein the second hard mask layer comprises SiN.

16. A method as in claim 13 wherein second ion milling is performed in a chemistry that contains Ar.

17. A method as in claim 13 further comprising depositing a second hard mask layer, constructed of a material that can be removed by reactive ion etching, over the physically robust, image transfer layer.

18. A method for manufacturing a magnetic write head for perpendicular magnetic recording, the method comprising:
providing a substrate;
depositing a magnetic write pole material over the substrate;
depositing an alumina hard mask layer over the magnetic write pole material, the alumina hard mask being a first hard mask;
depositing a SiN mask layer over the alumina first hard mask layer;
depositing an AlTiO image transfer layer over the SiN mask layer;
depositing a second hard mask layer comprising a material that can be removed by reactive ion etching over the AlTiO image transfer layer;
forming a photoresist mask over the second hard mask layer;
performing a first reactive ion etching to transfer the image of the photoresist mask onto the second hard mask;
performing a second reactive ion etching to transfer the image of the second hard mask onto the image transfer layer and the SiN mask layer;
performing a first ion milling to form a write pole;
conformally depositing an alumina side gap material layer;
performing a second ion milling in an Ar chemistry to remove a portion of the alumina side gap material layer and to expose the SiN mask layer;
performing a third reactive ion etching to remove the SiN mask layer; and
depositing a magnetic material to form a trailing magnetic shield.

19. A method as in claim 18 wherein the first and second reactive ion etchings are performed in a chlorine chemistry.

* * * * *